United States Patent [19]

Bogdanov et al.

[11] 4,010,392
[45] Mar. 1, 1977

[54] SUBMERSIBLE MOTOR

[76] Inventors: Alexandr Antonovich Bogdanov, Strastnoi bulvar, 7, kv. 39; Valentin Vasilievich Rodkin, Staro-Kashirskoe shosse, 2, korpus 12, kv. 19; Anatoly Andreevich Chudinovsky, Khlebozavodskoi proezd, 5, korpus 4, kv. 21, all of Moscow, U.S.S.R.

[22] Filed: Jan. 20, 1975

[21] Appl. No.: 542,398

[52] U.S. Cl. .............................................. 310/87
[51] Int. Cl.² ........................................ H02K 5/12
[58] Field of Search .................. 310/87, 54, 88, 58, 310/66, 59, 85, 89; 417/414

[56]  References Cited
UNITED STATES PATENTS

| | | | |
|---|---|---|---|
| 2,020,513 | 11/1935 | Mendenhall | 310/87 |
| 2,246,751 | 6/1941 | Nelson | 310/87 |
| 2,446,521 | 8/1948 | Blom | 310/87 |
| 2,455,022 | 11/1948 | Schmidt | 417/414 |
| 2,682,229 | 6/1954 | Luenberger | 310/87 |
| 2,958,795 | 1/1960 | Luenberger | 310/87 |
| 3,075,469 | 1/1963 | Lane | 310/87 |
| 3,502,919 | 3/1970 | Boyd | 310/87 |

Primary Examiner—R. Skudy
Attorney, Agent, or Firm—Fleit & Jacobson

[57] ABSTRACT

A submersible motor having a housing filled with a liquid dielectric. Disposed in said housing are the motor's stator and rotor. The motor is provided with a hydraulic protection system, which system comprises two chambers communicating with each other by means of a pipe disposed inside the motor housing. One of said chambers is arranged above the motor, adjacent to the end face thereof, and is filled with a liquid having a specific weight greater than that of the liquid media inside and around the motor and unmixable with said media, whereas the second chamber is arranged below the motor and filled with the same liquid dielectric as the motor housing, said second chamber communicating with the motor housing.

5 Claims, 5 Drawing Figures

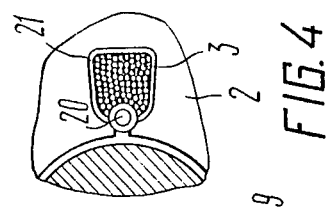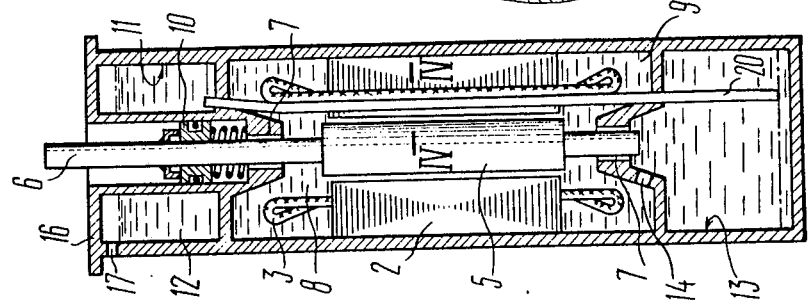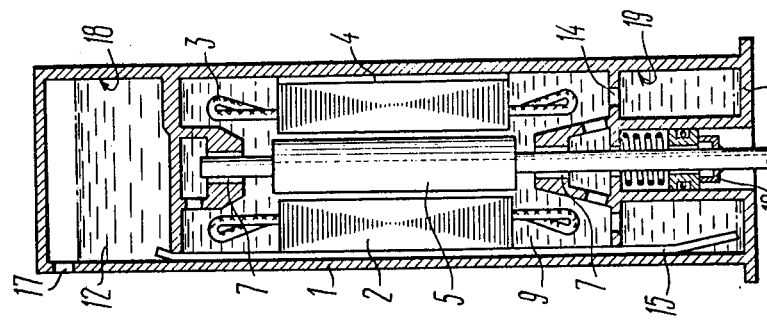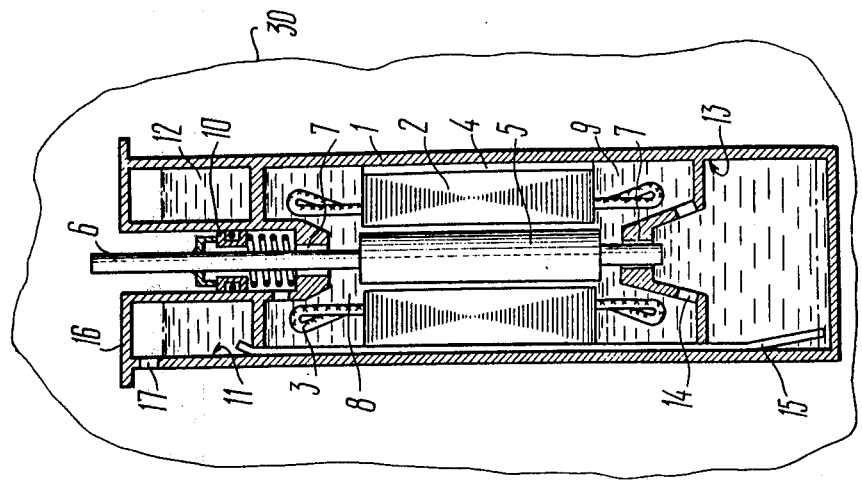

SUBMERSIBLE MOTOR

The present invention relates to submersible motors intended for operation in different liquid media, such as stratal water, oil, and salt and acid solutions.

The sumbersible motor of the present invention is applicable, for example, in deep-well pumps used for oil extraction and for lifting water, as well as aggressive and non-aggressive liquid media from boreholes, wells and natural and artificial basins. Submersible motors of the proposed type can also be employed as electric drill drives.

Designers of submersible electric machinery face a number of problems that arise from the necessity of protecting said machinery from the adverse effects of the surrounding liquid medium, especially if this is an aggressive and dielectrically imperfect medium which possesses, in addition, antifriction and corrosive properties.

There are known oil-filled submersible electromotors such as shown in U.S. Pat. No. 2,020,513, which submersible motors are provided with a hydraulic protection system comprising two chambers one of which is mounted on the delivery pipe column, above the pump, and filled with a liquid having a specific weight greater than that of the liquid media inside and around the motor and unmixable with said liquid media, whereas the second chamber is disposed below the motor and partially filled with the same liquid as the one filling said first chamber. The two chambers communicate with each other by means of a pipe extending outside the motor and pump housing.

It has to be pointed out, however, that submersible motors provided with the above hydraulic protection system have a number of disadvantages. One of these disadvantages results from the fact that said first chamber is mounted on the delivery pipe column, i.e. much higher than the motor location, which fact accounts for great excess pressure inside the motor. This, in turn, accounts for considerable leakage of the dielectric liquid filling the motor housing and reduces the reliability and service life of the motor. Another, no less important, disadvantage of the foregoing hydraulic protection system is the fact that the pipe communicating the two chambers is arranged outside the pump and motor housing, which results in reduced cross-secional dimensions of the pump and motor. The latter fact affects the reliability and performance of the pump and motor due to an increased length and weight thereof.

The adverse effects of reduced cross-sectional dimensions are felt most strongly in deep-well electric pumps whose size is limited by small internal diameters of casing pipes.

Still another disadvantage of the foregoing system stems from the necessity of having means for protecting the pipe disposed outside the pump and motor housing from mechanical damage in the course of assembly and lifting and lowering operations. This, however, entails an additional reduction in the cross-sectional dimensions of the deep-well pump and the motor.

In view of the foregoing disadvantages, submersible motors as disclosed in the above-mentioned U.S. Patent have proved to be impracticable.

It is an object of the present invention to overcome these disadvantages.

The invention aims at providing a hydraulic protection system of a submersible motor, which system would ensure normal operation of the motor and protect it from the adverse effects of the liquid medium around said motor.

The foregoing object of the present invention is attained by providing a submersible motor having a housing filled with a liquid dielectric, with a stator and rotor being disposed in said housing, and further including a hydraulic protection system for said motor, which system comprises two chambers, the first of which is disposed above the motor and filled with a liquid having a specific weight greater than that of the liquid media inside and around said motor and unmixable with the media, whereas the second chamber is arranged below the motor, communicates with the inside of the motor housing and is filled with the same liquid dielectric as the motor housing, said second chamber communicating with said first chamber by means of a pipe, the improvement residing, according to the invention, in the fact that said first chamber disposed above the motor is adjacent to the upper end face thereof, whereas the pipe communicating the two chambers is disposed inside the motor housing.

It is expedient that the upper chamber be constructed as a single whole with the motor housing and be provided with an opening at the upper portion thereof for communication with the surrounding medium. The pipe communicating the two chambers may be disposed in an axial channel or in a core slot. The function of said communicating pipe may be performed by a rotor shaft provided with an axial bore communicating with said chambers through radial openings located close to the respective bottoms of said chambers.

The submersible motor of the present invention is noted for invariably reliable and economical operation. The arrangement of the first chamber above the motor, in immediate proximity thereto, accounts for a minimum excess pressure inside the motor housing with respect to the pressure in the surrounding medium. This, in turn, minimizes the liquid dielectric leakage from the motor housing through the shaft seal. In addition, penetration of the surrounding medium inside the motor housing is ruled out completely. The arrangement of the communicating pipe in one of the axial channels normally provided in the core for the supply of oil, or the positioning of said pipe in a slot instead of missing conductors (it is common knowledge that in tapped series motors one of the slots corresponding to each phase has an incomplete number of conductors), or the utilization of the rotor shaft to communicate the two chambers with each other all help to keep the cross-sectional dimensions of the motor within the required limits, without affecting the cross-sectional dimensions of the pump, whereby a minimal weight of the pump and motor is combined with optimum performance of both.

The minimized leakage of the liquid dielectric from the motor housing considerably prolongs the motor's service in a well.

Other objects and advantages of the present invention will become more apparent from the following detailed description of preferred embodiments thereof to be read in conjunction with the accompanying drawings, wherein:

FIG. 1 is a view of a submersible motor with the free end of the shaft directed upwards, with chambers communicating with each other by means of a pipe disposed in an axial bore of the stator;

FIG. 2 is a view of a submersible motor with the free end of the shaft pointing downward, with chambers communicating with each other by means of a pipe disposed in an axial bore of the stator;

FIG. 3 is a view of a submersible motor with the free end of the shaft directed upwards, with chambers communicating with each other by means of a pipe disposed in a stator core slot;

FIG. 4 is a sectional view taken along the line IV-IV of FIG. 3;

Figure 5:
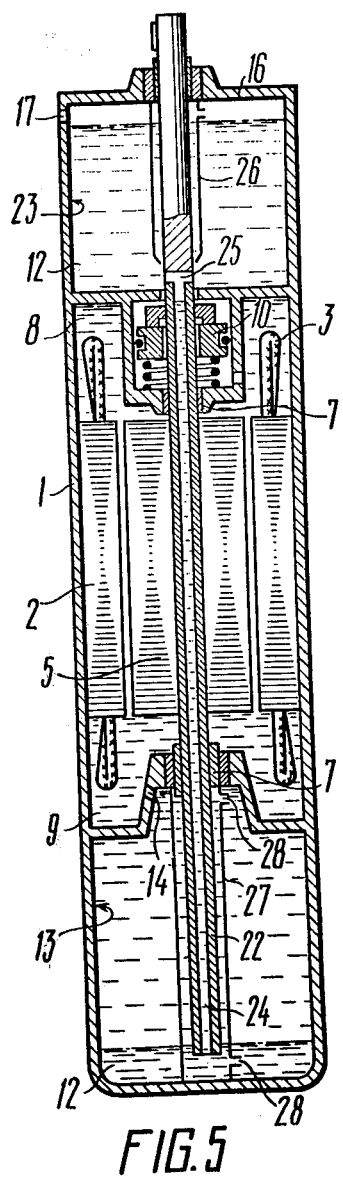
FIG. 5 is a view of a submersible motor with the free end of the shaft directed upwards, the chambers hydraulically communicating with each other through an axial axial provided in the rotor.

Referring now to the accompanying drawings, the submersible motor of the present invention (FIG. 1) comprises a housing 1. Arranged inside said housing 1 are a stator 2 having a winding 3 and axial channels 4, and a rotor 5 having a shaft 6 rotating in bearings 7.

An internal cavity 8 of the housing 1 is filled with a liquid dielectric 9 and sealed with a seal 10 at the place where the shaft 6 extends outside the motor housing.

At the upper portion of the motor there is an annular chamber 11 provided with an opening through which extends the shaft 6, said opening being sealed with the seal 10. The annular chamber 11 is filled with a liquid 12 having a specific weight greater than that of the liquid dielectric 9 and the liquid medium 30 around the motor and unmixable with said dielectric 9 and said liquid medium.

At the lower portion of the motor there is a second chamber 13 partially filled with the liquid dielectric 9, the same type of dielectric that fills the cavity 8. The chamber 13 communicates with the cavity 8 of the housing 1 through an opening 14.

The lower portion of the first chamber 11 communicates with the lower portion of the second chamber 13 by means of a pipe 15 disposed in one of the axial channels 4 of the stator 2.

The pipe 15 and the lower portion of the chamber 13 are filled with the liquid 12, the same type of liquid that fills the chamber 11, the level of said liquid 12 reaching as high as the end of said pipe 15.

Secured to an upper end face 16 of the motor housing 1 and to the shaft 6 is a working unit, for example, a pump, the submersible motor of the present invention serving as a drive for said working unit.

The chamber 11 communicates with the surrounding liquid medium through one or several openings 17 provided at the upper portion thereof.

Depending upon the operating conditions of the motor, the type of its winding and bearings and the properties of the surrounding medium, the liquid dielectric may be mineral, for example, transformer or synthetic oil, organosilicon and other liquids, whereas the function of the liquid having a specific weight greater than that of the liquid dielectric and the surrounding liquid medium and unmixable with said dielectric and said medium is performed by manometer, balancing and other liquids and, in some cases, water.

The arrangement of the pipe 15 for hydraulic communication between the chambers 11 and 13 in the axial channel 4 of the stator 2 is especially advantageous in submersible motors having such channels 4 for the overflow or circulation of a liquid dielectric inside the motor.

The submersible motor of FIG. 2 differs from that of FIG. 1 in that a working unit (for example, a pump or a drill) is attached to the lower portion thereof. For this reason an upper chamber 18 is made cylindrical, whereas a lower chamber 19 is annular, the lower end of the shaft provided with the seal 10 extending through an opening in said chamber 19.

Unlike the submersible motor of FIG. 1, in still another embodiment of the present invention as shown in FIGS. 3, 4, a pipe 20 communicating the chambers 11 and 13 with each other is disposed in a slot 21 of the core of the stator 2.

The latter arrangement of the pipe 20 is preferable in cases when there is a vacant space in the slots 21 of the stator core or when some slots have an incomplete number of conductors (which is the case, for example, with tapped series motors).

In the embodiment of FIG. 5 hydraulic communication between the two chambers is effected by means of a rotor shaft provided with an axial bore.

As in the previous embodiments, the latter submersible motor (FIG. 5) has the housing 1 arranged wherein are the stator 2 with the winding 3, and the rotor 5 having a shaft 22 rotating in the bearings 7.

The internal cavity 8 of the motor is filled with the liquid dielectric 9.

At the upper portion of the motor there is a chamber 23 filled with the liquid 12 having a specific weight greater than that of the liquid dielectric 9 and the surrounding medium and unmixable with said dielectric 9 and said surrounding medium. Communication of the chamber 23 with the surrounding liquid medium is effected by means of one or several openings 17 provided at the upper portion of said chamber 23.

At the lower portion of the motor there is the chamber 13 partially filled with the same liquid dielectric 9 as the internal cavity 8 of the motor. The chamber 13 communicates with the internal cavity 8 of the motor by means of one or more openings 14.

The upper end of the shaft 22 extends through and out of the chamber 23 on the side of its end face 16, whereas the lower end of said shaft extends as far as adjacent the bottom of the chamber 13.

The internal cavity 8 of the motor is separated from that of the chamber 23 by the seal 10.

Hydraulic communication between the chambers 13 and 23 is effected by means of an axial bore 24 and a radial bore 25 provided in the shaft 22.

The radial bore 25 is located close to the bottom of the chamber 23.

In order to avoid the mechanical mixing of the liquid 12 with the liquid found in the chamber 23 above the level of the liquid 12 in the course of rotation of the upper end of the shaft 22, the latter shaft end is enveloped by a pipe 26 whose lower end is disposed above the radial bore 25 in the shaft 22.

In order to prevent the mechanical mixing of the liquids 9 and 12 in the chamber 13 during rotation of the lower end of the shaft 22, the latter shaft end is enveloped by a pipe 27 provided with openings 28.

Hydraulic intercommunication between the chambers by means of the shaft 22 provided with the axial bore 24 is preferable in cases when axial channels in the stator core are either absent or for some reason undesirable; this equally applies to cases when the utilization of the shaft 22 provided with the axial bore 24 helps to simplify the motor structure (the tapped series motor being a case in point).

In order to avoid penetration of the surrounding liquid medium into the internal cavity 8 of the motor in the course of operation thereof or during idle time, the pressure of the liquid dielectric 9 inside the motor must always be somewhat higher than that of the surrounding medium.

The result will only be leakage of the dielectric 9 through the seal 10 into the surrounding medium. Unless the above condition is met, the surrounding liquid medium will penetrate into the internal cavity 8 and damage the stator winding insulation. If the motor operates in an aggressive medium the penetration of that medium into the internal cavity of the motor may also put other internally disposed components thereof out of action.

In order to produce an excess pressure in the internal cavity of the motor and make up for the leakage of the liquid dielectric 9 through the seal 10, the annular chamber 11 (FIG. 1), the pipe 15 and the lower portion of the chamber 13 are filled with the liquid 12 having a specific weight greater than that of the liquid dielectric 9 and the surrounding medium and unmixable with said dielectric 9 and said surrounding medium.

As a result, a pressure is developed in the internal cavity of the motor, which pressure is in excess of that of the surrounding liquid medium.

The liquid 12 having a specific weight greater than that of the liquid dielectric 9 tends to move from the upper chamber 11 through the pipe 15 to the lower portion of the chamber 13 and oust the liquid dielectric 9 from said chamber 13 and the internal cavity 8. This, however, is counteracted by the seal 10. As a result, a pressure is developed in the internal cavity 8 of the motor and in chamber 13, whose magnitude depends upon the difference between the specific weights of the liquid 12 and the liquid dielectric 9. The specific weight of the liquid 12 is greater than that of the surrounding medium; hence, the pressure of the liquid dielectric 9 inside the motor is greater than that of the liquid medium around the motor. As a result, the liquid dielectric 9 tends to move from the cavity 8 through the seal 10 into the surrounding medium, and not otherwise.

During operation of the motor the surrounding liquid medium will invariably be found in the annular chamber 11, above the level of the liquid 12, and will never come into contact with the liquid dielectric 9 either through the pipe 15 or the seal 10.

It must be said in conclusion that the annular chamber 11 and the pipe 15 allow the liquid 12 to move from the lower portion of the chamber 13 to the annular chamber 11 in case the liquid dielectric 9 increases in volume due to a rise in its temperature, which rules out dangerous pressure jumps.

What is claimed is:

1. A submersible motor for immersion in a surrounding medium comprising, in combination, a housing having a cavity, a motor disposed in said housing cavity, said motor including a rotor and a stator in surrounding relationship with said rotor, a first chamber in the upper portion of said housing adjacent the upper end face of said motor in sealed relationship with said housing cavity, said first chamber being provided with an opening at the upper portion thereof for communication with the surrounding medium, a second chamber in the lower portion of said housing adjacent the lower end face of said motor and communicating with said housing cavity, a liquid dielectric in said housing cavity and in the upper portion of said second chamber, conduit means within the interior of said housing communicating at opposite ends with said first and second chambers respectively and a liquid in said first chamber, said conduit means and the lower portion of said second chamber in intimate contact with the liquid dielectric in the upper portion of said second chamber, said liquid having a specific weight greater than that of and unmixable with the liquid dielectric and the surrounding medium for pressurizing said liquid dielectric in said cavity to prevent the penetration of the surrounding medium into said housing cavity.

2. A submersible motor in accordance with claim 1 wherein said housing is of tubular shape and wherein said first chamber comprises an axial portion of said tubular shaped housing and wherein said first chamber is provided with an opening at the upper portion thereof for communication with the surrounding medium.

3. A submersible motor in accordance with claim 1 wherein said conduit means comprises a pipe and wherein said stator is provided with an axial bore and wherein said pipe is disposed within said stator axial bore.

4. A submersible motor in accordance with claim 1 wherein said conduit means comprises a pipe and wherein said stator is provided with a core slot and wherein said pipe is disposed within said stator core slot.

5. A submersible motor in accordance with claim 1 wherein said motor includes a shaft and wherein said conduit means comprises an axial bore in said motor shaft and including radially extending conduit means for communicating the opposite ends of said shaft axial bore with the respective bottom portions of said first and second chambers.

* * * * *